May 19, 1925.
R. C. BOHANNAN
MODULATOR
Filed Feb. 23, 1924
1,537,982
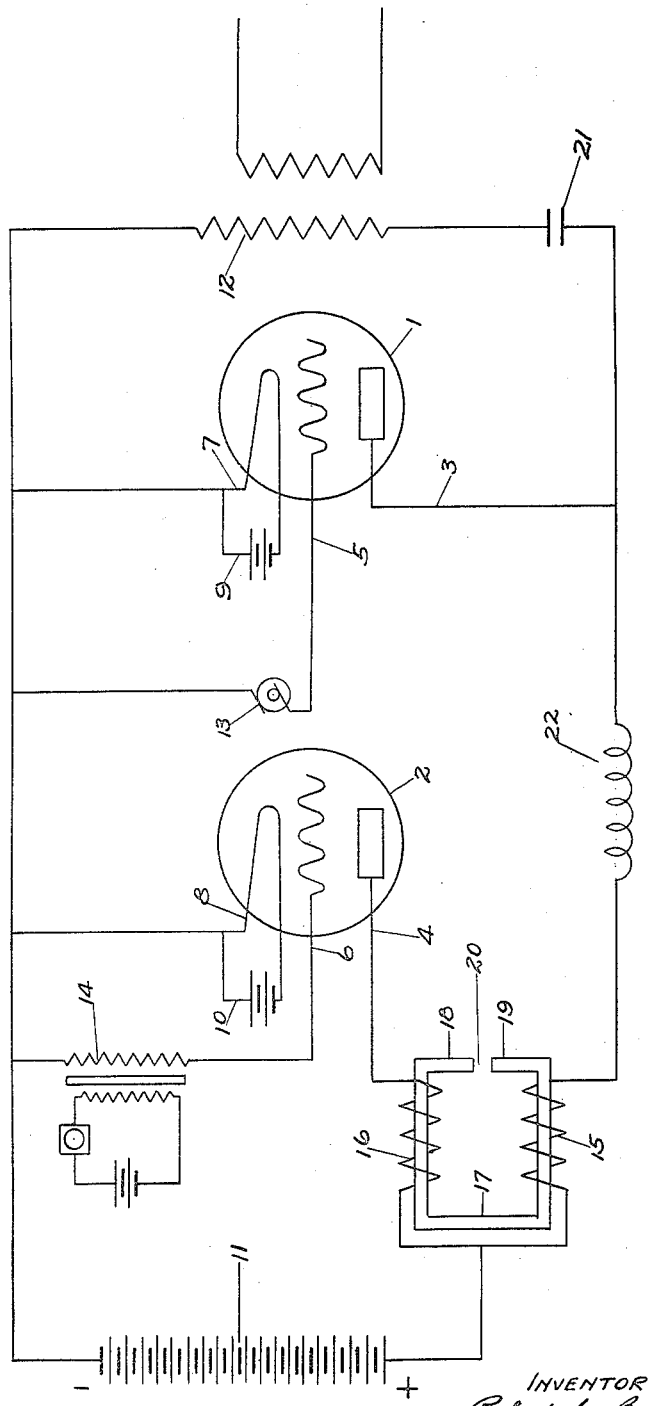
INVENTOR
Robert C Bohannan
By Dudley T Fisher
HIS ATTORNEY Patented May 19, 1925.

1,537,982

UNITED STATES PATENT OFFICE.

ROBERT C. BOHANNAN, OF COLUMBUS, OHIO.

MODULATOR.

Application filed February 23, 1924. Serial No. 694,541.

*To all whom it may concern:*

Be it known that I, ROBERT C. BOHANNAN, a citizen of the United States, residing at Columbus, in the county of Franklin and the State of Ohio, have invented certain new and useful Improvements in Modulators, of which the following is a specification, reference being had therein to the accompanying drawing.

The present invention relates to certain new and useful improvements in modulators, and particularly to that class of modulators adapted to impress wave forms of relatively low frequency upon the high frequency oscillations employed in the transmission of signals by radioactivity.

The especial object of this invention is to provide improved devices and arrangement of parts whereby electric oscillations of high frequency may be modulated in amplitude to conform without distortion to the waves of relatively low frequency but exceedingly complicated form produced by the currents in the circuits of a telephonic transmitter.

The means whereby I attain this object are fully set forth in the following specification, and illustrated in the accompanying drawing which is a diagrammatic showing of the preferred embodiment of my invention.

In the drawing the numerals 1 and 2 refer to the vacuum tubes having anode plates 3 and 4, grids 5 and 6 and cathode filaments 7 and 8 which latter are heated by suitable means such as the batteries 9 and 10 respectively. The filament-plate circuits of the tubes 1 and 2 are connected in parallel across a source of constant potential, such as the battery 11, and also across the secondary winding of the repeating coil 12 by which the system is inductively connected with the antenna or line as the case may be. In the filament-grid circuit of the tube 1 is included a source of high frequency electric oscillations, which may be of any preferred type, and which is diagrammatically illustrated at 13. In the filament-grid circuit of the tube 2 there is included a source of electric impulses of relatively low frequency, as for example a telephone transmitter which is diagrammatically illustrated at 14. Included in the circuit between the plates 3 and 4 and the battery 11 are two coils 15 and 16 which are so wound and connected as to produce opposed magnetic fields. The coils 15 and 16 are preferably mounted upon a common magnetic core 17 which may be of any shape suitable to the conditions under which the apparatus is operated, but which I prefer to make of rectangular form, the reflexed ends 18 and 19 closely approaching but not contacting with each other to produce an air gap 20 of considerable width. A suitable stoppage condenser 21 is placed in the circuit between the repeating coil 12 and the plate 3, and a choke coil 22 is placed between the plate 3 and the coil 15 for a purpose which will hereinafter appear.

In the operation of the system the battery 11 tends to maintain a flow of constant current across the ionized space between the plates 3 and 4 and their respective filaments 7 and 8, but the condenser 21 prevents the short circuiting of the battery 11 through the repeating coil 12. At the same time the oscillations produced by the oscillator 13 act, through the agency of the grid 5, upon the current flowing between the plate 3 and the filament 7 to send oscillations into the repeater 12, the choke coil 22 acting to exclude these oscillations from the tube 2 and the battery 11. Due to the character of the winding and the manner of connecting the coils 15 and 16, the ends 18 and 19 of the core 17 are of like polarity, and any variation in the strength of one pole will be accompanied by a similar but opposite variation of the magnetic strength of the other. The impulses produced in the circuit of the telephone transmitter 14 are impressed upon the current flowing between the grid 6 and the filament 8 of the tube 2, and by it are impressed upon the current flowing between the plate 4 and the filament 8 in the manner well understood in the art. These variations in the plate current, which flows through the coil 16, produce corresponding changes in the magnetic strength of the pole 18 of the core 17 which react upon the pole 19 to produce corresponding but opposite variations in the magnetic strength of the pole 19. These variations in the strength of the pole 19 tend to induce potential impulses in the coil 15, and these impulses react upon the current flowing in the plate-filament circuit of the tube 1 and by it superimposed upon the high frequency oscillations emitted by the tube 1. By the reaction occurring in the tube 1 the amplitude of the high frequency oscillations is modulated to conform to the wave forms of the impulses in the circuit of the telephone transmitter 14, and these modulated oscillations flow into the repeating coil 12 and by it are transmitted to the line or antenna as the case may be.

By the maintenance of a suitable air gap 20 between the poles 18 and 19 the magnetic saturation of the core 17 is prevented, thereby permitting wide variations in its magnetic strength, either by additions or subtractions, and increasing its sensitiveness to the minute changes of current corresponding to the exceedingly complicated wave forms of the impulses produced by the telephone transmitter, with a corresponding reduction in the tendency to distortion of said wave forms.

What I claim is:—

1. In an apparatus of the class described, the combination with two vacuum tubes of the three electrode type having their plate-filament circuits connected in parallel across a source of constant potential current supply, of means in the grid-filament circuit of one of said tubes to cause potential variations of relatively low frequency, means in the grid-filament circuit of the other tube to produce electric oscillations of relatively high frequency, and an electromagnet connected between the plate of each tube and the source of current supply said magnets being connected and arranged to induce opposed magnetic fields as and for the purpose set forth.

2. In an apparatus of the class described, the combination with two vacuum tubes of the three electrode type having their plate-filament circuits connected in parallel across a source of constant potential current supply, of means in the grid-filament circuit of one of said tubes to cause potential variations of relatively low frequency, means in the grid-filament circuit of the other tube to produce electric oscillations of relatively high frequency, a coil connected between the plate of each tube and said source of current supply, and a common magnetic core in operative relation with said coils as and for the purpose set forth.

3. In an apparatus of the class described, the combination with two vacuum tubes of the three electrode type having their plate-filament circuits connected in parallel across a source of constant potential current supply, of means in the grid-filament circuit of one of said tubes to cause potential variations of relatively low frequency, means in the grid filament circuit of the other tube to produce electric oscillations of relatively high frequency, a coil connected between the plate of each tube and said source of current supply, said coils being connected and arranged to induce opposed magnetic fields, and a common magnetic core in operative relation with said coils as and for the purpose set forth.

4. In an apparatus of the class described, the combination with two vacuum tubes of the three electrode type having their plate-filament circuits connected in parallel across a source of constant potential current supply, of means in the grid-filament circuit of one of said tubes to cause potential variations of relatively low frequency, means in the grid-filament circuit of the other tube to produce electric oscillations of relatively high frequency, a coil connected between the plate of each tube and said source of current supply, and a common magnetic core in operative relation with said coils, having its ends reflexed and separated by a relatively narrow gap as and for the purpose set forth.

5. In an apparatus of the class described, the combination with two vacuum tubes of the three electrode type having their plate-filament circuits connected in parallel across a source of constant potential current supply, of means in the grid-filament circuit of one of said tubes to cause potential variations of relatively low frequency, means in the grid filament circuit of the other tube to produce electric oscillations of relatively high frequency, a coil connected between the plate of each tube and said source of current supply said coils being connected and arranged to induce opposed polarities, and a common magnetic core in operative relation with said coils having its ends reflexed and separated by a relatively narrow gap as and for the purpose set forth.

6. In an apparatus of the class described, the combination with two vacuum tubes of the three electrode type having their plate-filament circuits connected in parallel across a source of constant potential current supply, of a repeating coil connected in parallel with said plate-filament circuits, means in the grid-filament circuit of one of said tubes to cause potential variations of relatively low frequency, means in the grid-filament circuit of the other tube to produce electric oscillations of relatively high frequency, and an electromagnet connected between the plate of each tube and said source of current supply as and for the purpose set forth.

7. In an apparatus of the class described, the combination with two vacuum tubes of the three electrode type having their plate filament circuits connected in parallel across a source of constant potential current supply, of a repeating coil connected in parallel with said plate-filament circuits, means in the grid-filament circuit of one of said tubes to cause potential variations of relatively low frequency, means in the grid-filament circuit of the other tube to produce electric oscillations of relatively high frequency, a coil connected between the plate of each tube and said source of current supply, and a common magnetic core in operative relation with said coils as and for the purpose set forth.

8. In an apparatus of the class described, the combination with two vacuum tubes of the three electrode type having their plate-filament circuits connected in parallel across a source of constant potential current supply, of a repeating coil connected in parallel with said plate-filament circuits, means in the grid-filament circuit of one of said tubes to cause potential variations of relatively low frequency, means in the grid filament circuit of the other tube to produce electric oscillations of relatively high frequency, means to prevent the flow of current from said source of current supply in said repeating coil, and means to exclude said oscillations from said source of current supply as and for the purpose set forth.

9. In an apparatus of the class described, the combination with two vacuum tubes of the three electrode type having their plate-filament circuits connected in parallel across a source of constant potential current supply, of means in the grid-filament circuit of one of said tubes to cause potential variations of relatively low frequency, means in the grid-filament circuit of the other tube to produce electric oscillations of relatively high frequency, and a coil connected between the plate of each of said tubes and said source of current supply said coils being connected and arranged to induce opposed magnetic fields as and for the purpose set forth.

10. In an apparatus of the class described, the combination with two vacuum tubes of the three electrode type, having their plate-filament circuits connected in parallel across a source of constant potential current supply, of means in the grid-filament circuit of one of said tubes to cause potential variations of relatively low frequency, means in the grid-filament circuit of the other tube to produce electric oscillations of relatively high frequency, and means connected between the plates of each tube and the source of current supply to cause the variations of the first mentioned tube to modulate the oscillations of the last mentioned tube as and for the purpose set forth.

11. In an apparatus of the class described, the combination with two vacuum tubes of the three electrode type having their plate-filament circuits connected in parallel across a source of constant potential current supply, of means in the grid-filament circuit of one of said tubes to cause potential variations of relatively low frequency, means in the grid-filament circuit of the other tube to produce electric oscillations of relatively high frequency, and means to cause the potential variations to modulate said electric oscillations as and for the purpose set forth.

12. In an apparatus of the class described, the combination with two vacuum tubes of the three electrode type having their plate-filament circuits connected in parallel across a source of constant potential current supply, of a repeating coil connected in parallel with said plate-filament circuits, means in the grid-filament circuit of one of said tubes to cause potential variations of relatively low frequency, means in the grid-filament circuit of the other tube to produce electric oscillations of relatively high frequency, and means to cause said potential variations to modulate said electric oscillations as and for the purpose set forth.

13. In an apparatus of the class described, the combination with two vacuum tubes of the three electrode type having their plate-filament circuits connected with a source of constant potential current supply, of means in the grid-filament circuit of one of said tubes to cause potential variations of relatively low frequency, means in the grid-filament circuit of the other tube to produce electric oscillations of relatively high frequency, a coil connected between the plate of each tube and said source of current supply, and a common magnetic core in operative relation with said coils having its ends reflexed and separated by a relatively narrow gap as and for the purpose set forth.

14. In an apparatus of the class described, the combination with two vacuum tubes of the three electrode type, of means in the grid-filament circuit of one of said tubes to cause potential variations of relatively low frequency, means in the grid-filament circuit of the other tube to produce electric oscillations of relatively high frequency, a coil connected with the plate of each tube, and a common magnetic core in operative relation with said coils having its ends reflexed and separated by a relatively narrow gap as and for the purpose set forth.

In testimony whereof I affix my signature.

ROBERT C. BOHANNAN.